(12) United States Patent
Tsirkin

(10) Patent No.: US 10,185,572 B2
(45) Date of Patent: *Jan. 22, 2019

(54) OPERATING SYSTEM LOAD DEVICE RESOURCE SELECTION

(71) Applicant: RED HAT ISRAEL, LTD., Raanana (IL)

(72) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 100 days.

This patent is subject to a terminal disclaimer.

(21) Appl. No.: 14/992,911

(22) Filed: Jan. 11, 2016

(65) Prior Publication Data

US 2016/0124753 A1    May 5, 2016

Related U.S. Application Data

(63) Continuation of application No. 13/407,971, filed on Feb. 29, 2012, now Pat. No. 9,235,427.

(51) Int. Cl.
| | | |
|---|---|---|
| *G06F 9/00* | (2006.01) | |
| *G06F 9/24* | (2006.01) | |
| *G06F 15/177* | (2006.01) | |
| *G06F 9/4401* | (2018.01) | |
| *G06F 9/455* | (2018.01) | |
| *G06F 21/57* | (2013.01) | |

(52) U.S. Cl.
CPC ........ *G06F 9/4408* (2013.01); *G06F 9/45545* (2013.01); *G06F 9/45558* (2013.01); *G06F 21/572* (2013.01); *G06F 2009/45575* (2013.01)

(58) Field of Classification Search
CPC ....................................................... G06F 9/44
See application file for complete search history.

(56) References Cited

U.S. PATENT DOCUMENTS

| | | |
|---|---|---|
| 5,237,690 A | 8/1993 | Bealkowski et al. |
| 5,353,432 A | 10/1994 | Richek et al. |
| 5,517,646 A | 5/1996 | Piccirillo et al. |
| 5,596,728 A * | 1/1997 | Belmont ............... G06F 1/1632 361/679.41 |
| 5,748,980 A | 5/1998 | Lipe et al. |
| 5,768,542 A | 6/1998 | Enstrom et al. |
| 5,793,979 A | 8/1998 | Lichtman et al. |

(Continued)

OTHER PUBLICATIONS

Marshall et al., PCI Express in Depth for Windows Vista and Beyond, Core Platform Architecture, Microsoft WinHec 2006, Advancing the Platform, Microsoft Corporation, retrieved on Dec. 31, 2015, 49 slides.

(Continued)

*Primary Examiner* — Mohammed H Rehman
(74) *Attorney, Agent, or Firm* — Lowenstein Sandler LLP

(57) ABSTRACT

A method for booting is provided. A devices manager disables resources of a bootable device of a list of bootable devices having resource conflicts with a selected one of the list of bootable devices. The devices manager attempts to boot the selected bootable device. If the selected bootable device fails to boot, then the devices manager selects a next bootable device of the list of bootable devices for booting and repeats disabling resources and attempting to boot the selected next bootable device until one of the list of bootable devices boots or all bootable devices of the list of bootable devices fail to boot.

20 Claims, 5 Drawing Sheets

(56) References Cited

U.S. PATENT DOCUMENTS

| | | | | |
|---|---|---|---|---|
| 5,974,546 | A | 10/1999 | Anderson | |
| 5,999,989 | A | 12/1999 | Patel | |
| 6,003,100 | A * | 12/1999 | Lee | G06F 1/1616 710/10 |
| 6,038,689 | A | 3/2000 | Schmidt et al. | |
| 6,161,151 | A | 12/2000 | Sudhakaran et al. | |
| 6,230,285 | B1 | 5/2001 | Sadowsky et al. | |
| 6,496,847 | B1 | 12/2002 | Bugnion et al. | |
| 6,546,483 | B1 * | 4/2003 | Lai | G06F 9/4411 710/10 |
| 6,591,320 | B1 | 7/2003 | Cheston et al. | |
| 6,961,941 | B1 | 11/2005 | Nelson et al. | |
| 7,114,066 | B1 * | 9/2006 | Swanninathan | G06F 9/452 713/1 |
| 7,308,511 | B2 * | 12/2007 | Wilson | G06F 9/4411 710/10 |
| 7,356,677 | B1 | 4/2008 | Rafizadeh | |
| 7,363,407 | B2 * | 4/2008 | Oshins | G06F 9/4812 710/260 |
| 7,716,446 | B1 | 5/2010 | Chen et al. | |
| 7,818,559 | B2 | 10/2010 | Sadovsky et al. | |
| 7,840,790 | B1 | 11/2010 | Sekhar et al. | |
| 7,861,117 | B2 | 12/2010 | Coronado et al. | |
| 8,060,875 | B1 | 11/2011 | Lambeth | |
| 8,095,929 | B1 | 1/2012 | Ji et al. | |
| 8,095,931 | B1 | 1/2012 | Chen et al. | |
| 8,141,075 | B1 | 3/2012 | Chawala et al. | |
| 8,239,665 | B2 | 8/2012 | Liu et al. | |
| 8,495,350 | B2 | 7/2013 | Chan et al. | |
| 8,949,587 | B2 | 2/2015 | Tsirkin | |
| 2002/0133695 | A1 * | 9/2002 | Khatri | G06F 9/4411 713/1 |
| 2003/0014619 | A1 | 1/2003 | Cheston et al. | |
| 2003/0033397 | A1 | 2/2003 | Gurumoorthy et al. | |
| 2003/0041088 | A1 | 2/2003 | Wilson et al. | |
| 2003/0084278 | A1 | 5/2003 | Cromer et al. | |
| 2004/0205258 | A1 * | 10/2004 | Wilson | G06F 9/4411 710/1 |
| 2005/0076324 | A1 | 4/2005 | Lowell et al. | |
| 2005/0091022 | A1 | 4/2005 | Levit-Gurevich et al. | |
| 2005/0190699 | A1 | 9/2005 | Smith et al. | |
| 2006/0155667 | A1 | 7/2006 | Tolba | |
| 2006/0293936 | A1 | 12/2006 | Breiter et al. | |
| 2007/0006227 | A1 | 1/2007 | Kinney et al. | |
| 2007/0150651 | A1 | 6/2007 | Nemiroff et al. | |
| 2008/0155332 | A1 | 6/2008 | Landers et al. | |
| 2009/0013171 | A1 | 1/2009 | Gilling | |
| 2009/0083529 | A1 | 3/2009 | Bandholz et al. | |
| 2010/0070705 | A1 | 3/2010 | Samuelraj et al. | |
| 2010/0223451 | A1 * | 9/2010 | Hitaka | G06F 9/4411 713/2 |
| 2012/0102159 | A1 | 4/2012 | Luo | |
| 2012/0284496 | A1 | 11/2012 | Aslot et al. | |

OTHER PUBLICATIONS

U.S. Appl. No. 13/407,971, Non-Final Office Action, dated Nov. 12, 2014, 8 pages.

U.S. Appl. No. 13/407,971, Final Office Action, dated Apr. 7, 2015, 9 pages.

U.S. Appl. No. 13/407,971, Advisory Action, dated Jun. 25, 2015, 3 pages.

U.S. Appl. No. 13/407,971, Notice of Allowance, dated Sep. 14, 2015, 9 pages.

Compaq Computer Corporation et al., Plug and Play BIOS Specification, Version 1.0A, May 5, 1994, 56 pages.

\* cited by examiner

OPERATING SYSTEM LOAD DEVICE RESOURCE SELECTION

CROSS-REFERENCE TO RELATED APPLICATIONS

This application is a continuation of U.S. patent application Ser. No. 13/407,971, filed Feb. 29, 2012, and is hereby incorporated by reference.

TECHNICAL FIELD

Embodiments of the present invention relate to a computer system, and more specifically, to a method for dynamic loading of operating systems on bootable devices.

BACKGROUND

Virtualization permits multiplexing of an underlying host machine between different virtual machines. The host computer allocates a certain amount of its resources to each of the virtual machines. Each virtual machine is then able to use the allocated resources to execute applications, including operating systems (referred to as guest operating systems (OS)). The software layer providing the virtualization is commonly referred to as a hypervisor and is also known as a virtual machine monitor (VMM), a kernel-based hypervisor, or a host operating system. The hypervisor emulates the underlying hardware of the host computer, making the use of the virtual machine transparent to the guest operating system and the user of the computer.

Loading a host OS is normally performed by loading firmware, which scans "real" devices in a computing system in some predetermined order, until a bootable device is found and the host OS is loaded and booted from the bootable device. Conventional loading firmware attempts to enable all resources for (supported) devices in a computing system before the OS is loaded, even though only one such device may be used to load the OS, and others may be used by the OS after the OS is loaded. This may create device resource conflicts: for example, each device may need a certain amount of PIO memory, while the total amount of PIO memory in the computing is limited to less than 64 Kbytes.

Loading a guest OS in a virtual environment is normally performed by a hypervisor, which scans "virtual" devices in a computing system in some predetermined order, until a bootable virtual device is found and the virtual OS is loaded and booted from the "bootable" virtual device. Similar guest resource conflicts may arise among guests devices within a virtual machine or between virtual machines. For example, a 32 bit guest can address 4 GBytes of memory. As a result, virtual memory becomes a guest limited resource. Virtual IO ports and interrupt lines are another example.

BRIEF DESCRIPTION OF THE DRAWINGS

The present invention is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Methods and systems for booting bootable devices are described herein. In one embodiment, a devices manager disables resources of one or more bootable devices of a list of bootable devices having resource conflicts with a selected one of the list of bootable devices. The devices manager attempts to boot the selected one of the list of bootable devices. If the selected one of the list of bootable devices fails to boot, then the devices manager selects a next bootable device of the list of bootable devices for booting and repeats disabling resources and attempting to boot the selected next bootable device until one of the list of bootable devices boots or all bootable devices of the list of bootable devices fail to boot. In one embodiment, the bootable devices reside on a host machine and the device manager is a boot loader. In another embodiment, the bootable devices are virtual bootable devices residing on a virtual machine, residing on the host machine. Resource conflicts may a real resource and or virtual resource or both.

In one embodiment, resources not required for booting may be allocated after booting the OS using required allocated resources. Resources not required for booting may include user selected resources or resources unsupported by firmware or both.

In one embodiment, disabling the resources of bootable devices having resource conflicts may include unconditionally disabling device resources associated with all devices in the list of bootable devices, or only those devices from the first bootable device in the list to a bootable device just preceding the currently selected device to be booted.

In one embodiment, selecting a bootable device from among the bootable devices may occur in a predetermined order determined by a boot loader or by a hypervisor.

Embodiments of the present invention may eliminate device conflicts in a virtual environment when multiple virtual machines compete for the same resources at boot time, thereby reducing service requests and improving efficiency. In a non-virtual environment, embodiments of the present invention eliminate the need for user interaction and menus devoted to selecting which devices to boot from and in what order. This simplifies the user-machine interface.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
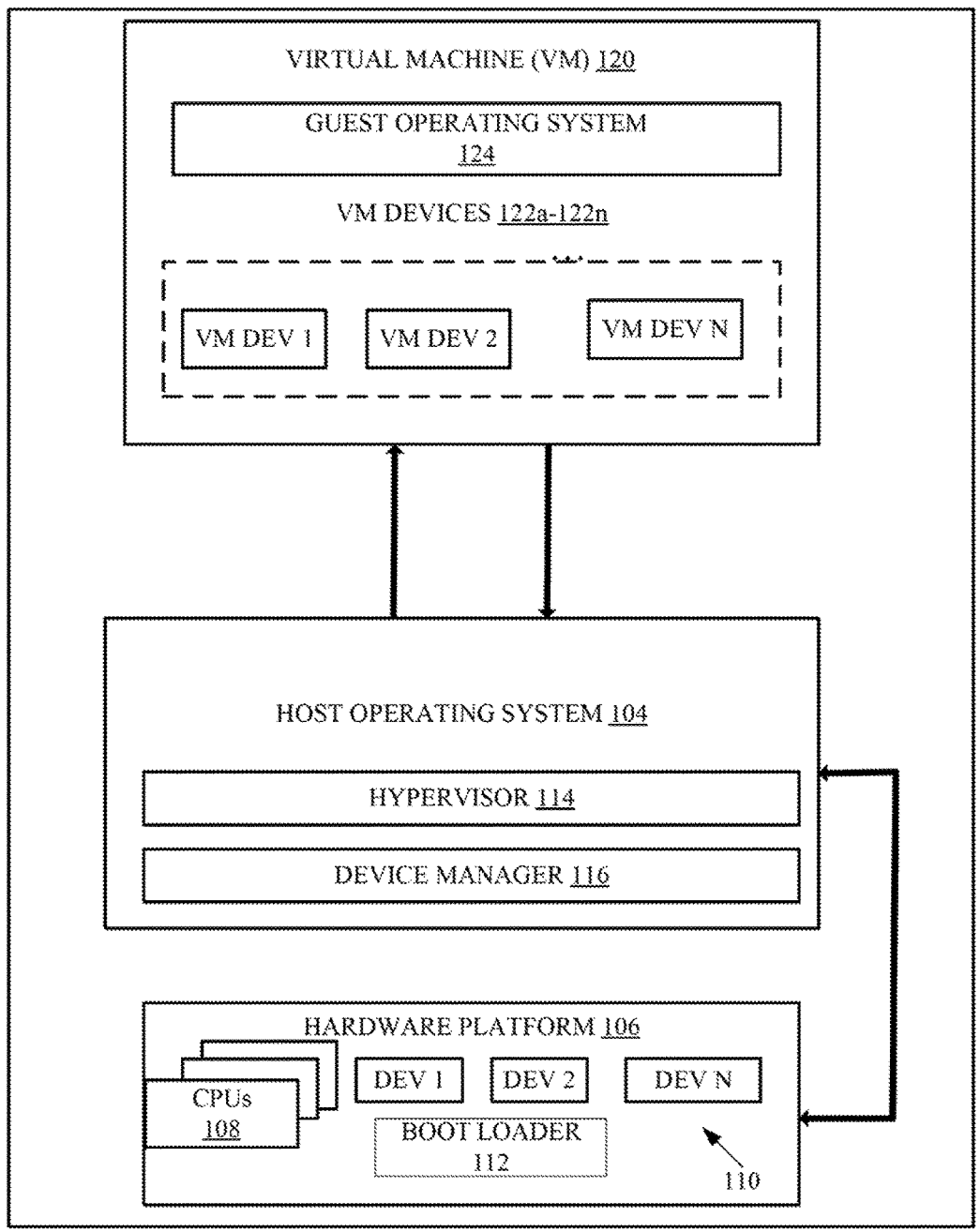
FIG. 1 is a block diagram of a computing system in which embodiments of the present invention may be implemented.

FIG. 1 is a block diagram illustrating one embodiment of a computer system 100, in which embodiments of the present invention may be implemented. The computer system 100 may be a host machine such as, for example, a server computer, a gateway computer or any other suitable computer system that is configurable for operating as a host.

The host machine (HM) (also referred to as a host computer system) 100 comprises an operating system 104 and a hardware platform 106. Operating system 104 may include Microsoft Windows®, Linux®, Solaris®, Mac® OS or any other suitable operating system for managing operations on the HM of computer system 100.

The hardware platform 106 may include one or more central processing units (CPUs) 108, devices 110, and boot loader firmware 112. Devices 110 may be comprised of one or more hardware and software devices, which may be located internally and externally to computer system 100. Examples of devices 110 include random-access memory (RAM), non-volatile storage memory (e.g., Flash, EEPROM, solid state drives (SSD), etc.), magnetic storage memory (e.g., one or more hard drives), optical memory (e.g., CDs, DVD, BlueRay drives, etc.), network interface cards (NICs), sound or video adaptors, photo/video cameras, printer devices, keyboards, displays or any other suitable device intended to be coupled to a computer system. One or more of the devices 110 running on the HM 100 may be bootable, i.e., devices from which operating system 104 of the HM may be loaded and made executable by the boot loader (firmware) 112.

The HM 100 may be configured with one or more virtual machines (VMs) 120. A VM 120 is a portion of software that, when executed on appropriate hardware, creates an environment allowing the virtualization of an actual physical computer system. The VM 120 may function as a self-contained platform, comprising one or more virtual devices 122a-122n running under the control of a guest operating system 124. The guest operating systems 124 of the VMs 120 may be the same or different operating system from the host operating system 104. Similar to the host operating system 104, the guest operating system 124 may include Microsoft Windows®, Linux®, Solaris®, Mac® OS or any other suitable operating system for managing operations associated with a virtualization environment.

A hypervisor 114, which emulates the underlying hardware platform 106 for VM 120, is provided and may run on the host operating system 104 of the HM. A hypervisor is also known as a virtual machine monitor (VMM), a kernel-based hypervisor or a host operating system. The hypervisor 114 may support multiple VMs 120 residing on the HM of computer system 100. Alternatively, more than one hypervisor (not shown) may be provided to support multiple VMs 120 residing on the HM 100.

One or more of the virtual devices 122a-122n within a virtual machine 120 may be configured to emulate a bootable device from which to load and execute an operating system 124 of the virtual machine 120. This may be accomplished via a device manager 116 that may provide the same or similar functionality as the boot loader 112.

In the hardware platform 106, the boot loader 112 may provide a default or user selectable ordering (via a boot loader menu (not shown)) of the (bootable) devices 110 from which to boot the operating system 104 of the HM. Because of this ordering, the resource requirements (e.g., memory, I/O) of only one of the devices 110 need to be met before loading and executing the host operating system 104 at any one time. In a virtual environment, the hypervisor 114 may be configured to impose a predetermined order of booting of the virtual devices 122a-122n. In an embodiment, the predetermined order of booting (of the host or virtual) bootable devices may be lifted. In another embodiment, all (of the host or virtual) bootable devices and their corresponding required resources may be initialized, potentially resulting in resource conflicts.

To remedy this situation in a virtual environment, the device manager 116 residing in host operating system 104 of the HM may be configured to disable some or all of conflicting resources required by the virtual devices 122a-122n before attempting to boot a guest operating system 124 on a selected bootable virtual device (e.g., 122a or VM DEV 1). If the selected bootable virtual device (e.g., 122a or VM DEV 1) in an optional predetermined order successfully boots, its resources are provided and the VM 120 operates from the selected virtual bootable device (e.g., 122a or VM DEV 1). If the selected virtual bootable device (e.g., 122a or VM DEV 1) fails to boot the guest operating system 124, the process is repeated for the remaining bootable virtual devices (e.g., 122b-122n or VM DEV 2 to VM DEV N) in the optional predetermined order after the resources required of the remaining bootable virtual devices (e.g., 122b-122n or VM DEV 2 to VM DEV N) having device conflicts are disabled, etc., until all bootable virtual devices (e.g., 122a-122n or VM DEV 1 to VM DEV N) have been tried.

Similarly, in a host environment, the boot loader 112 residing in firmware on the hardware platform 106 may be configured to disable some or all of conflicting resources required by the (real) devices DEV1-DEV N before attempting to boot the host operating systems 104 on a selected bootable (real) device (e.g., DEV 1). If the selected bootable device (e.g., DEV 1) in an optional predetermined order successfully boots, its resources are provided and the host machine 100 operates from the selected bootable device (e.g., DEV 1). If the selected bootable device (e.g., DEV 1) fails to boot the host operating systems 104, the process is repeated for the remaining bootable devices (e.g., DEV 2 to DEV N) in the optional predetermined order after the resources required of the remaining bootable devices (e.g., DEV 2 to DEV N) having device conflicts are disabled, etc., until all bootable virtual devices (e.g., DEV 1 to DEV N) have been tried.

Figure 2:
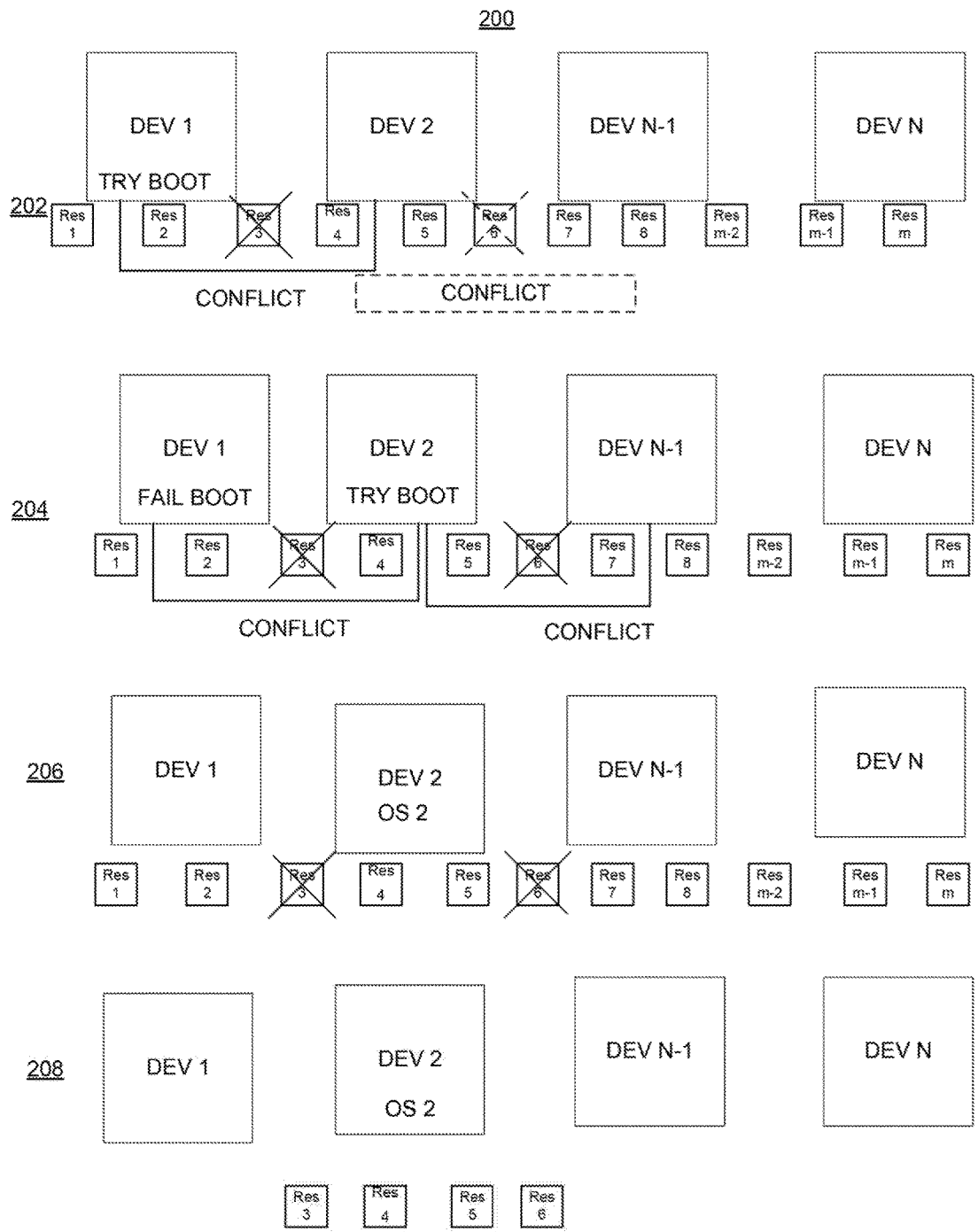
FIG. 2 is a block diagram graphically illustrating one embodiment of a method for booting devices having resource conflicts.

FIG. 2 is a block diagram graphically illustrating one embodiment of a mechanism 200 described above for booting devices having resource conflicts. Mechanism 200 is may be applicable to booting a guest OS 124 from one of the virtual bootable devices 122a-122n of the VM 120 under the control of the device manager 116 of the hypervisor 114, or to booting the host operating system 104 on the hardware platform 106 from one of the bootable devices 110 of the HM 100 under the control of the boot loader firmware 112. In FIG. 2, either the boot loader 112 or the device manager 116 are referred to as the device manager 116.

At stage 202, all bootable devices 1 through N have been initialized including their required resources. Bootable devices 1 through N are checked by the device manager 116 for potential resource conflicts. In the example, a required resource conflict (e.g., for Res 3) exists between devices DEV 1 and DEV 2, and between devices DEV 2 and DEV N−1 (e.g., for Res 6). In an embodiment, the conflicting required resources of devices DEV 1 (i.e., Res 3) are disabled by the device manager 116, and device manager 116 attempts to boot device DEV 1 with guest operating system 124.

At stage 204, DEV 1 fails to boot. As a result, DEV 1 is placed back in the list of bootable devices requesting resources by the device manager 116 but marked as failing to boot. The device manager 116 checks again for conflicts among bootable devices DEV 1-DEV N. Again, a required resource conflict (e.g., for Res 3) exists between devices DEV 1 and DEV 2, and between devices DEV 2 and DEV N−1 (e.g., for Res 6). Again, the conflicting required resources of devices DEV 1 (i.e., Res 3) are disabled by the device manager 116, and device manager 116 attempts to boot device DEV 2 with guest operating system 124.

At stage 206, DEV 2 boots guest operating system 124. At stage 208, the resources required by DEV 2 are enabled for device DEV 2 by device manager 116 (e.g., Res 3-Res 6).

In one embodiment, the mechanism 200 may be modified to boot the host operating system 104 from one of the bootable devices 110 by modifying the boot loader 112 to implement the mechanism 200 if the HM 100.

Figure 3:
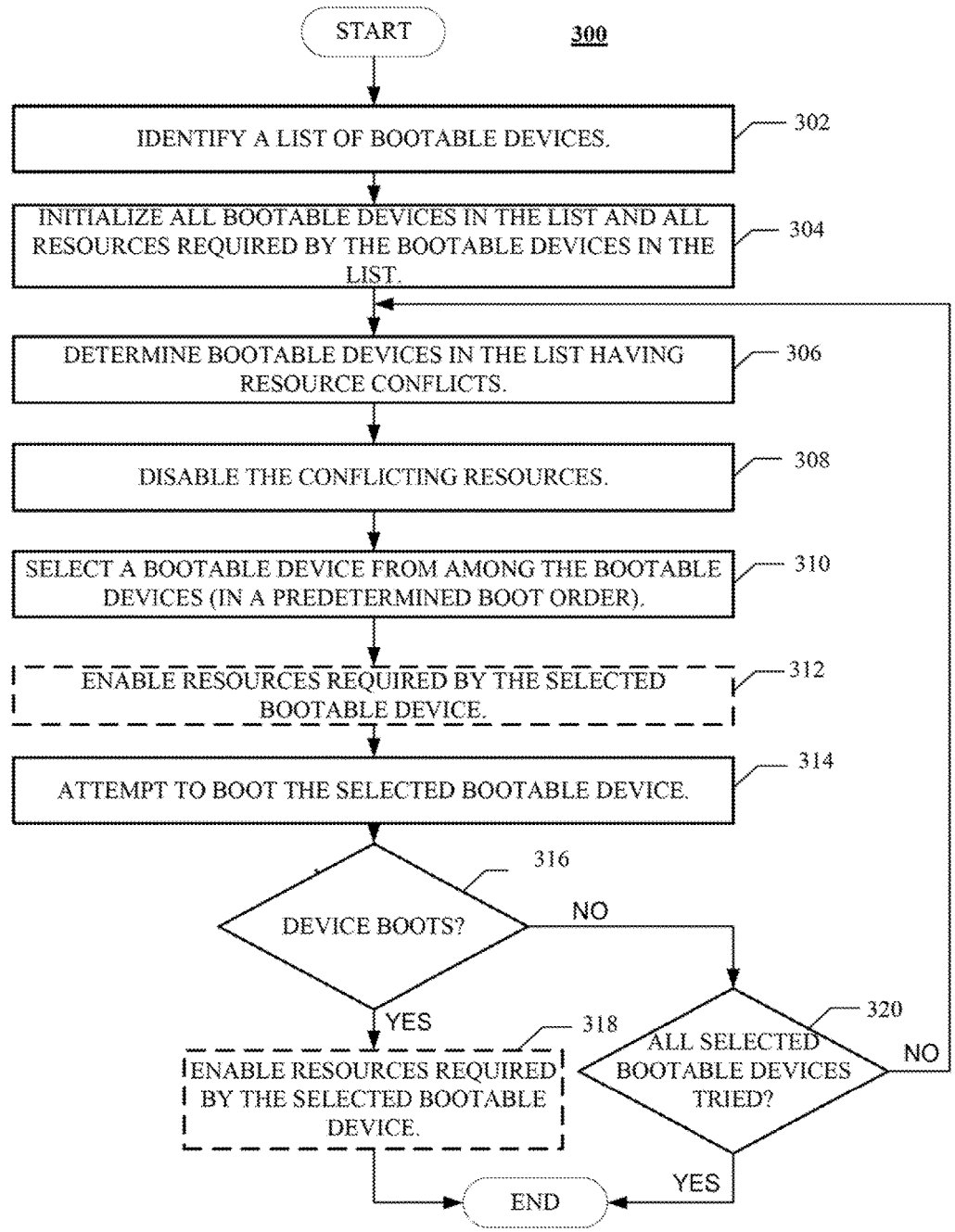
FIG. 3 is a flow diagram illustrating one embodiment of a method for booting devices having resource conflicts.

FIG. 3 is a flow diagram illustrating one embodiment of a method 300 for booting devices having resource conflicts. Although the method 300 is described in terms of booting guest OS 124 from one of the bootable virtual devices 122a-122n (e.g., VM DEV 1 to VM DEV N) on the VM 120, the method 300 of FIG. 3 may be applied to the HM 100 under the control of the boot loader firmware 112 to boot the host operating system 104 on the hardware platform 106 from one of the bootable devices 110.

Method 300 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 300 is performed primarily by the device manager 116 of the host OS 104 of the HM of FIG. 1.

Referring to FIG. 3, in one embodiment, method 300 begins when, at block 302, a list of bootable devices is identified by the device manager 116. In one embodiment, the list may be predefined and have a predefined booting order. At block 304, the device manager 116 initializes all bootable virtual devices in the list (e.g. 122a-122n) and all resources required by the bootable virtual devices in the list. At block, 306, the device manager 116 determines from the list those virtual bootable devices having conflicting resource requirements.

At block 308, the device manager 116 disables required resources of those bootable virtual devices 122a-122n having any resource conflicts. At block 310, the device manager 116 may select a bootable device (e.g., 122a) from among the bootable devices 122a-122n in a predetermined order selected by the device manager 116. At block 312, the device manager 116 may optionally enable the previously conflicted resources required by the selected bootable device. At block 314, the device manager 116 loads a guest OS (e.g., 124) and attempts to boot the selected bootable device (e.g., 122a) from the guest OS 124.

If, at block 316, the selected bootable device (e.g., 122a) fails to boot the guest OS 124, then at block 320, the device 122a that failed to boot the guest OS 124 placed back in list of bootable devices by the device manager 116 but marked as failing to boot and another of the bootable devices 122b-122n is selected (e.g., 122b) by the device manager 116 from the list. Blocks 304-316 of the method 300 are re-executed for the next selected bootable virtual device (e.g., 122b) by the device manager 116. It should be noted that, in one embodiment, when one bootable device 122a has failed to boot and has been placed back in the list but marked as failed, then device conflicts are re-checked by the device manager 116 among all of the bootable devices 122a-122n, since new conflicts may arise among any of the bootable virtual devices 122a-122n. Blocks 304-320 may be repeated until one of the selected bootable virtual device 122a-122n boots or the list of bootable virtual devices is exhausted.

If, in block 316, a selected bootable device successfully boots the guest OS 124 (e.g., 122b), then at optional block 318, the device manager 116 of the hypervisor 114 may allocate either virtual or real device resources required by the guest operating system 124 for the selected booted bootable virtual device (e.g., 122b). The resources not required for booting may include user selected resources and/or resources unsupported by firmware.

In one embodiment, the device manager 116 may unconditionally disable conflicting device resources associated with all devices in the list of bootable devices.

Figure 4:
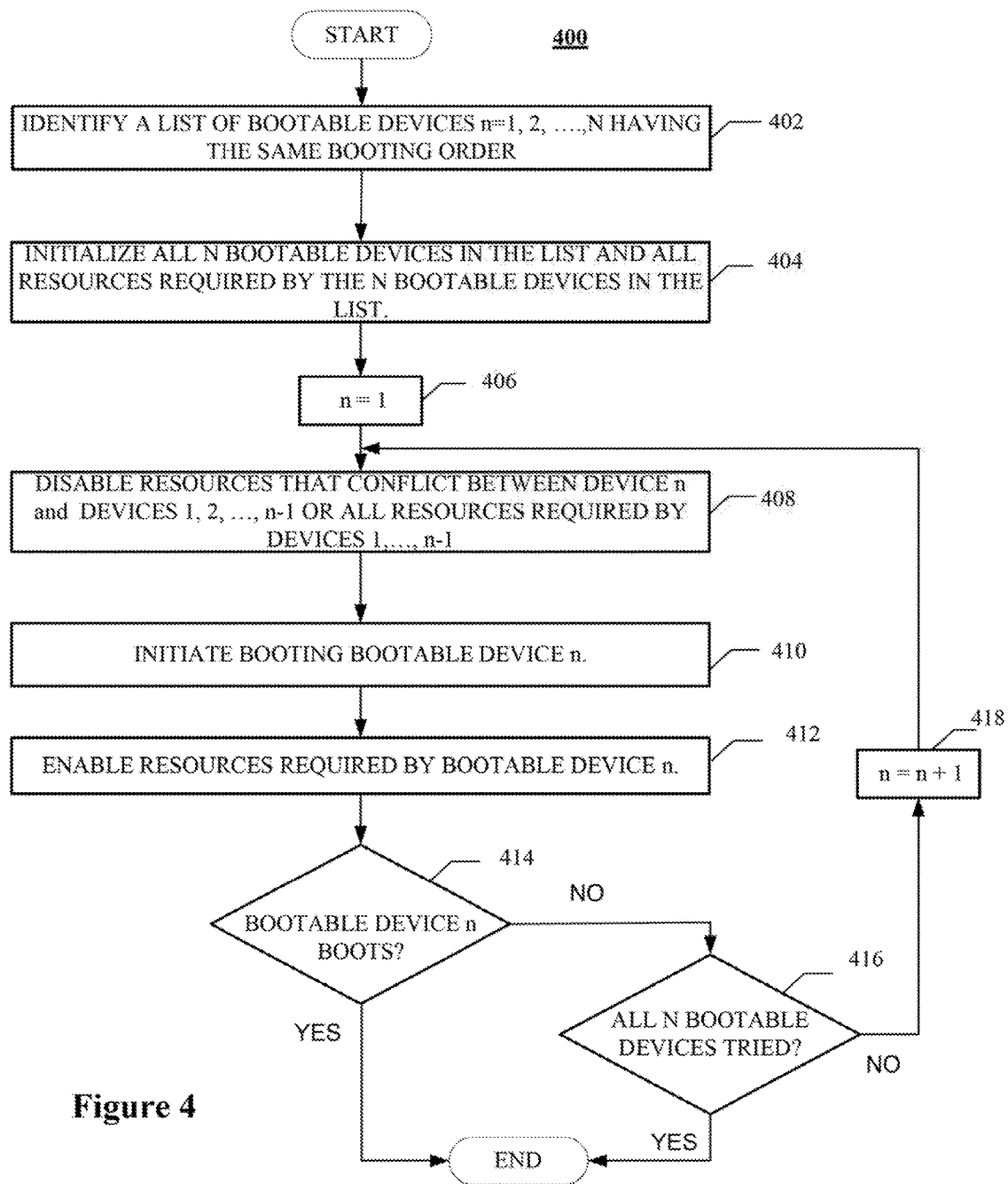
FIG. 4 is a flow diagram illustrating another embodiment of a method for booting devices having resource conflicts.

FIG. 4 is a flow diagram illustrating one embodiment of a method 400 for booting devices having resource conflicts. Although the method 400 is described in terms of booting guest OS 124 from one of the bootable virtual devices 122a-122n (e.g., VM DEV 1 to VM DEV N) on the VM 120, the method 400 of FIG. 4 may be applied to the HM 100 under the control of the boot loader firmware 112 to boot the host operating system 104 on the hardware platform 106 from one of the bootable devices 110.

Method 400 may be performed by processing logic (e.g., in computer system 500 of FIG. 5) that may comprise hardware (e.g., circuitry, dedicated logic, programmable logic, microcode, etc.), software (such as instructions run on a processing device), firmware, or a combination thereof. In one embodiment, method 400 is performed primarily by the device manager 116 of the host OS 104 of the HM of FIG. 1.

Referring to FIG. 4, in one embodiment, method 400 begins when, at block 402, a predefined list of virtual bootable devices n=1, 2, . . . , N is identified by the device manager 116. In one embodiment, the list has a predefined booting order (e.g., n=1, 2, . . . , N). At block 404, the device manager 116 initializes all N bootable virtual devices in the list (e.g. 122a-122n) and all resources required by the N bootable virtual devices in the list. At block 406, the device manager selects the first bootable device (e.g. 1 or VM DEV1) in the predefined list in the predefined order. At block 408, the device manager 116 determines from the list those virtual bootable devices having conflicting resource requirements and disables resources that conflict between the current selected device to be booted (e.g. 1 or VM DEV1) and the previous n−1 virtual devices (e.g., none). At block 410, the device manager 116 loads a guest OS (e.g., 124) and attempts to boot the selected bootable device (e.g., 122a). At block 412, the device manager 116 enables all resources required by the selected bootable device. If, at block 414, the selected bootable device (e.g., 122a) fails to boot the guest OS 124, then at block 416, the device 122a that failed to boot the guest OS 124 placed back in list of bootable devices by the device manager 116. At block 418, the device manager 116 selects the next bootable device (e.g. 2 or VM DEV2 or 122b) in the predefined list in the predefined order. Blocks 408-414 of the method 400 are re-executed for the next selected bootable virtual device (e.g. 2 or VM DEV2 or 122b) by the device manager 116. Blocks 408-418 may be repeated until one of the selected bootable virtual device 122a-122n boots or the list of bootable virtual devices is exhausted.

In one embodiment, the device manager 116 may unconditionally disable conflicting device resources associated with all devices in the list of bootable devices between the first bootable device in the list (e.g. 1 or VM DEV1 or 122a) and the device just preceding the currently selected bootable device (e.g. 1 to n−1 or VM DEV1 to VM DEV n−1).

Figure 5:
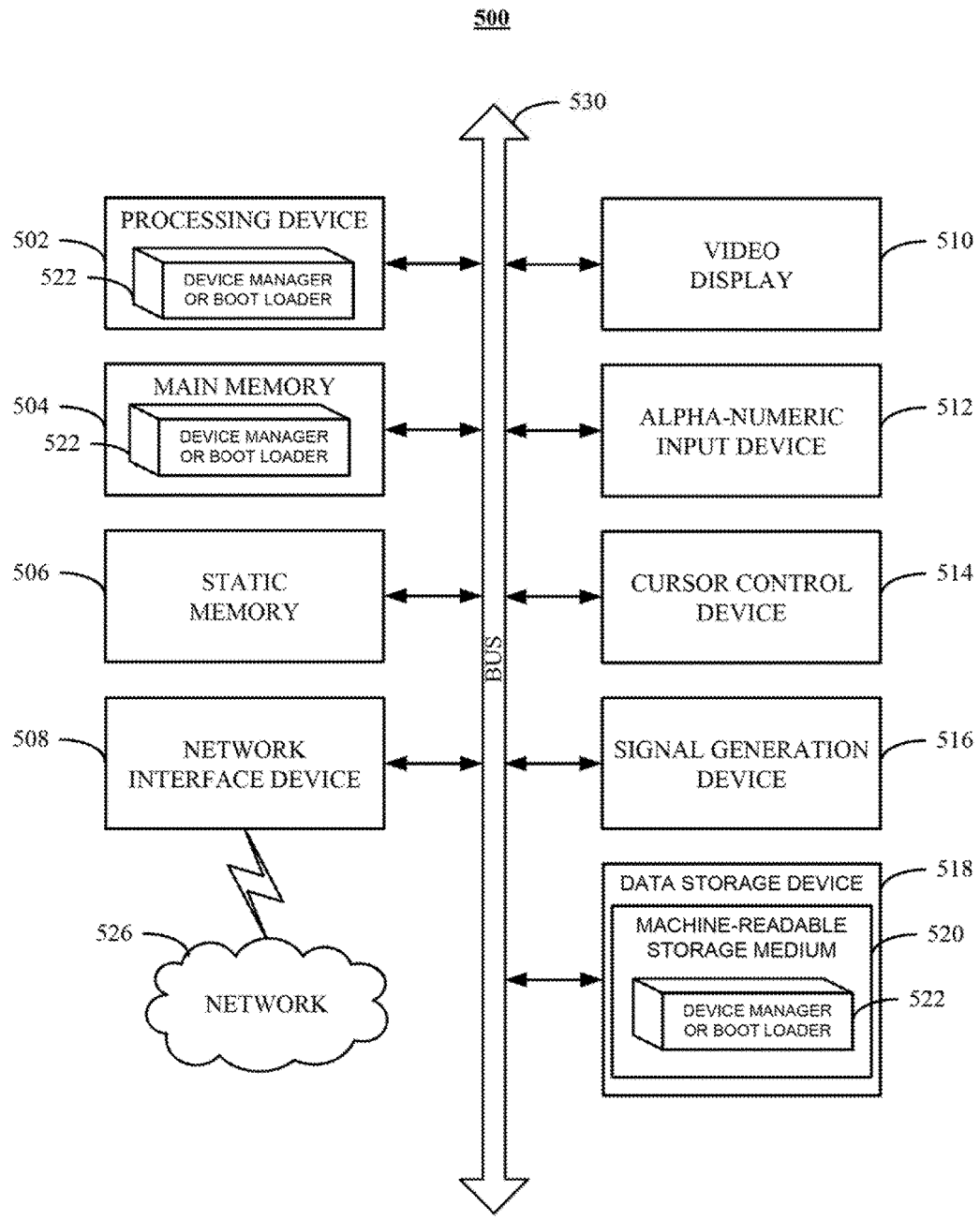
FIG. 5 illustrates a diagrammatic representation of a machine in the exemplary form of a computer system within which a set of instructions, for causing the machine to perform any one or more of the methodologies discussed herein, may be executed.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. Processing device 502 is configured to execute the device manager or boot loader 522 for performing the operations and steps discussed herein.

Computer system 500 may further include a network interface device 508. Computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

Data storage device 518 may include a machine-readable storage medium (or more specifically a computer-readable storage medium) 520 having one or more sets of instructions (e.g., the device manager or boot loader 522) embodying any one or more of the methodologies of functions described herein. The device manager or boot loader 522 may also reside, completely or at least partially, within main memory 504 and/or within processing device 502 during execution thereof by computer system 500; main memory 504 and processing device 502 also constituting machine-readable storage media. Device manager or boot loader 522 may further be transmitted or received over a network 526 via network interface device 508.

Machine-readable storage medium 520 may also be used to store the device queue manager logic persistently. While machine-readable storage medium 520 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instruction for execution by the machine and that causes the machine to perform any one or more of the methodologies of the present invention. The term "machine-readable storage medium" shall accordingly be taken to include, but not be limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling", "transmitting", "requesting", "identifying", "querying", "retrieving", "forwarding", "determining", "passing", "processing", "disabling", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will be apparent from the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   disabling, as part of an operating system loading process, resources of a bootable device of a plurality of bootable devices having resource conflicts with a selected one of the plurality of bootable devices, wherein the selected one of the plurality of bootable devices comprises a physical device associated with the operating system;
   enabling one or more of the disabled resources that are required by the selected physical device:
   attempting to boot the selected physical device from the operating system; and
   responsive to the operating system failing to load on the selected physical device:
     selecting a next bootable device of the plurality of bootable devices for booting; and
     repeating, by a processing device, said disabling resources and attempting to boot the selected next bootable device from the operating system until at least one of the plurality of bootable devices boots or all bootable devices of the plurality of bootable devices fail to boot.

2. The method of claim 1, further comprising:
   initializing the plurality of bootable devices; and
   attempting to allocate resources required by each of the plurality of bootable devices.

3. The method of claim 1, wherein the plurality of bootable devices is a predetermined list of bootable devices.

4. The method of claim 1, further comprising selecting the one or next of the plurality of bootable devices in a predetermined order.

5. The method of claim 1, further comprising allocating resources not required for booting after initiating booting using required allocated resources.

6. The method of claim 5, wherein resources not required for booting comprise at least one of user selected resources or resources unsupported by firmware.

7. The method of claim 1, wherein disabling the resources of the bootable device having resource conflicts further comprises unconditionally disabling device resources associated with an additional device of the plurality of bootable devices.

8. The method of claim 1, wherein disabling the resources of the bootable device having resource conflicts further comprises unconditionally disabling device resources associated with a first bootable device and a bootable device immediately preceding the selected or next of the plurality of bootable devices.

9. A computer system, comprising:
   a memory;
   a processing device, operatively coupled to the memory; and
   an operating system hosted by the computer system, having access to the memory and use of the processing device, the operating system to:
     disable resources of a bootable device of a plurality of bootable devices having resource conflicts with a selected one of the plurality of bootable devices, wherein the selected one of the plurality of bootable devices comprises a physical device associated with an operating system;
     enable one or more of the disables resources that are required by the selected physical device;
     attempt to boot the selected physical device from the operating system; and
     responsive to the operating system failing to boot on the selected physical device:
       select a next bootable device of the plurality of bootable devices for booting; and
       repeat, by the processing device, said disabling resources and attempt to boot the selected next bootable device from the operating system until at least one of the plurality of bootable devices boots or all bootable devices of the plurality of bootable devices fail to boot.

10. The system of claim 9, wherein the operating system is further to:
    initialize the plurality of bootable devices; and
    attempt to allocate resources required by each of the plurality of bootable devices.

11. The system of claim 9, wherein the plurality of bootable devices is a predetermined list of bootable devices.

12. The system of claim 9, wherein the operating system is further to allocate resources not required for booting after initiating booting using required allocated resources.

13. The system of claim 12, wherein resources not required for booting comprise at least one of user selected resources or resources unsupported by firmware.

14. The system of claim 9, wherein to disable the resources of the bootable device having resource conflicts, the operating system further to unconditionally disable device resources associated with an additional device of the plurality of bootable devices.

15. The system of claim 9, wherein to disable the resources of the bootable device having resource conflicts, the operating system further to unconditionally disable device resources associated with a first bootable device and a bootable device immediately preceding the selected or next of the plurality of bootable devices.

16. The system of claim 9, wherein the next bootable device resides on a virtual machine, residing on the host machine.

17. A non-transitory computer-readable storage medium comprising instructions to cause a processing device to:
    disable resources of a bootable device of a plurality of bootable devices having resource conflicts with a selected one of the plurality of bootable devices, wherein the selected one of the plurality of bootable devices comprises a physical device associated with an operating system;
enable one or more of the disabled resources that are required by the selected physical device:
attempt to boot the selected physical device from the operating system; and
responsive to the selected physical device failing to load:
select a next bootable device of the plurality of bootable devices for booting; and
repeat, by the processing device, disabling the resources, enabling the one or more disabled resources, and attempting to boot the selected next bootable device until at least one of the plurality of bootable devices boots or all bootable devices of the plurality of bootable devices fail to boot.

18. The non-transitory computer-readable storage medium of claim 17, wherein the processing device is further to:
initialize the plurality of bootable devices; and
attempt to allocate resources required by each of the plurality of bootable devices.

19. A method comprising:
disabling resources of a bootable device of a plurality of bootable devices having resource conflicts with a selected one of the plurality of bootable devices, wherein the selected one of the plurality of bootable devices comprises an operating system;
enabling one or more of the disabled resources required by the selected bootable device;
attempting to boot the selected bootable device; responsive to the selected bootable device failing to boot:
selecting a next bootable device of the plurality of bootable devices for booting; and
repeating, by a processing device, said disabling resources and attempting to boot the selected next bootable device until at least one of the plurality of bootable devices boots or all bootable devices of the plurality of bootable devices fail to boot.

20. The method of claim 19, further comprising allocating resources not required for booting after initiating booting using required allocated resources, wherein resources not required for booting comprise at least one of user selected resources or resources unsupported by firmware.

* * * * *